Oct. 6, 1964     H. F. JURGELEIT     3,151,360

POLAR MICROINCH FINISH VENTED MOLD

Filed Feb. 15, 1962     2 Sheets-Sheet 1

INVENTOR
HERBERT F. JURGELEIT

BY

*Arthur L. Whinston*

ATTORNEY.

Oct. 6, 1964
H. F. JURGELEIT
3,151,360
POLAR MICROINCH FINISH VENTED MOLD
Filed Feb. 15, 1962
2 Sheets-Sheet 2
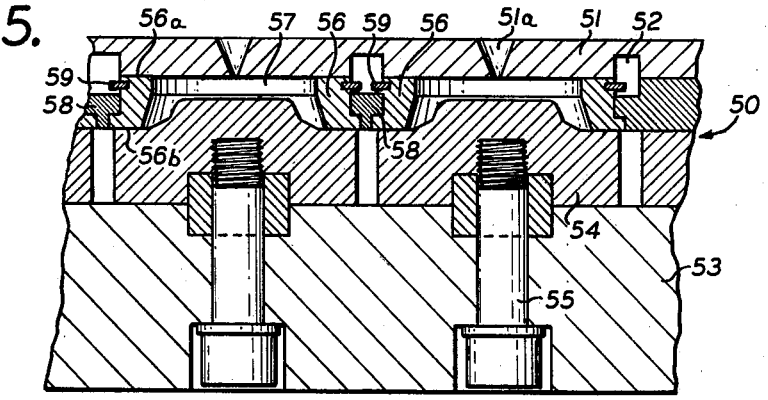
FIG. 5.
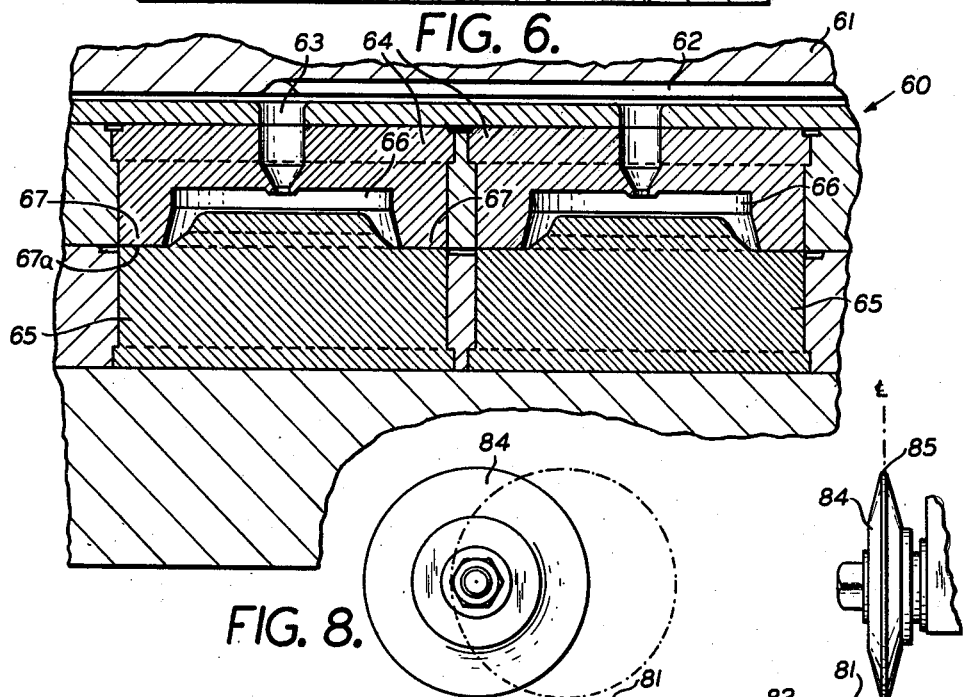
FIG. 6.
FIG. 8.
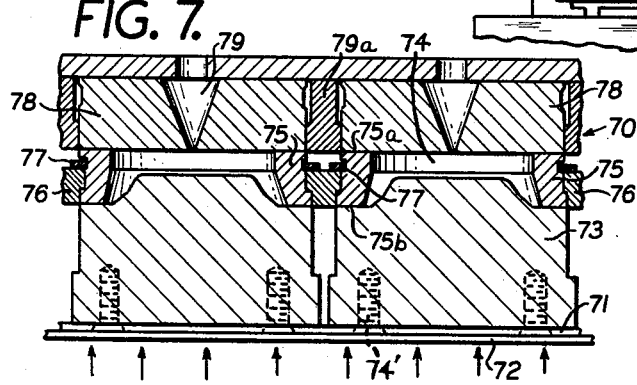
FIG. 7.
FIG. 9.
INVENTOR
HERBERT F. JURGELEIT
BY
Arthur L. Whinston
ATTORNEY.

United States Patent Office 3,151,360
Patented Oct. 6, 1964

3,151,360
POLAR MICROINCH FINISH VENTED MOLD
Herbert F. Jurgeleit, Oceanside, N.Y., assignor to United States Rubber Company, New York, N.Y., a corporation of New Jersey
Filed Feb. 15, 1962, Ser. No. 173,491
2 Claims. (Cl. 18—42)

This invention relates to apparatus for molding articles of rubber or rubber-like materials or other moldable materials and, more particularly, to an improved finish to be applied to molds or dies for producing such articles free from flash and blisters.

Recently, molds have been developed which utilize weakened sections to flex or provide a diaphragm action when subjected to pressure, so as to pinch off the mold cavities where the mold faces come together. These molds provide a positive metal-to-metal seal between the cavity land sealing surfaces during the molding cycle. (See, for example, U.S. Patent Nos. 2,883,704 and 2,962,761 and U.S. patent application Serial No. 20,650, filed April 7, 1960, which has issued as Patent No. 3,121,918.

When the molding compound enters these flashless mold cavities, the air originally present therein must find a path of escape or it will become trapped and form blisters on the finally molded parts. The more positive the seal between the cavity land surfaces, the greater the tendency toward air trapping and blisters. Hence, with the advent of these flashless molds, the air trapping problem became acute.

In order to avoid these difficulties, it became the practice to grind a finish on the cavity land surfaces to close specifications as to flatness and microinch smoothness. The minute grooves produced on the land surfaces by this grinding were found to be effective in affording a means for the air to filter out of the mold cavities during the injection process, yet they did not result in flash on the molded parts. (That air flow between two metal surfaces in contact can be affected by the degree of surface flatness and smoothness can be demonstrated by placing together two Johanson gauge blocks. One block can be suspended from the other with no support other than the vacuum, i.e., absence of air flow, between the surfaces in contact.)

The microinch grind finish heretofore specified either ran crosswise of the cavity lands, i.e., completely across and not concentric with the cavities, in order to permit the displaced air from the cavities to escape across the lands through the minute grooves thus afforded, or a so-called "radial" grind was used, which latter type of grind applied curved grind marks to the land surfaces. These curved grind marks were produced by the side or face of the grinding wheel in a manner well known to the art. Both the crosswise finish and the radial or circular finish, however, resulted in the grind finish marks of one land surface crossing with respect to the grind finish marks on the corresponding mating land surface. In the case of the circular grind finish, since the finish on each land was made up of a series of parallel circular ridges and valleys, the two mating land surfaces contacted one another across a series of points where the circular grind marks crossed. When the lands were placed under high pressure, there developed a tendency toward hobbing at the points of contact, thus tending to blockade the valleys and impair the effectiveness thereof as a means of air escape.

With the advent of automatic molding equipment utilizing higher injection pressures and shorter cures, i.e., cures of one minute or less as compared with the conventional cures of over three minutes, air trapping became an acute problem with flashless molds even with the microinch finish. This is because the injection time, i.e., time required to fill the mold cavities, must be markedly reduced in order to fill the cavities before setting up of the compound occurs; hence, the air in the cavities has a proportionally shorter time in which to escape. An improved microinch finish permitting the air to escape more rapidly was thus required and it is an object of the present invention to provide such a finish. It is a further object of the present invention to provide such a finish which will operate without the use of conventional vent holes or grooves and will prevent the formation of flash or blisters in the finally molded articles.

In accordance with the invention as ordinarily applied in the flashless injection molding of rubber and rubber-like materials, the mating or engaging land surfaces of the mold parts are ground with a microinch finish on at least one of the parts in such a manner as to have the grind finish marks all emanate from the center of the mold cavity, so that the ridges and grooves are in straight lines coinciding with the radii of a circle whose center is at the center or centroid of the mold cavity. This method of grinding thus provides a "polar" oriented surface finish and results in a marked improvement over the prior microinch finishes. The new polar type of microinch finish is generally of the same smoothness (10 to 20 microinches) as the prior types, but since the ridges and valleys produced all emanate from the center, i.e., the "pole," of the mold cavity, if mating surfaces are so treated, there is assured a predominance of line-to-line contacts instead of point-to-point contacts as was the case with the straight-across and circular grind patterns, regardless of whether or not one such mating land surface should become rotated in relation to the other. As will be obvious, surfaces meeting in such line-to-line contact can sustain a much greater load without hobbing or crushing of the ridges than would be the case with the prior finishes.

Additionally, since the grind finish marks in the new polar finish are all straight lines, the finish is superior to the radial or circular grind pattern in respect to shortness and directness of the paths by which the air may escape from the mold cavities. This is true whether only one mating surface or both are so treated. Because of the very minute cross-sectional areas of the grooves, the air in its escape from the mold cavities must flow at high velocity. Since losses due to curves or bends in the flow path in the case of turbulent high-velocity flow are closely proportional to the square of the velocity, a grind finish in which the marks are all straight lines will be superior to one in which curved lines are used. This is especially important when the flashless molding techniques are applied to injection molding machines of the horizontal or vertical types, wherein the injection times are markedly reduced in order to prevent premature curing of the molding compound. As mentioned heretofore, since the injection times are reduced, the air in the cavities has a proportionally shorter time in which to escape.

The new polar type of microinch finish is also superior to the crosswise finish above described in that the latter type of grind pattern leaves two opposite sides of each cavity without air vents. The length of the vents is also longer than in the case of the polar finish except at the two opposite points on each cavity in which the finish marks pass through the mold center.

Where two surfaces each ground with a polar finish mate, it might be objected that the minute surface ridges and valleys of the grind finish marks would mesh and thus effectively blockade any escape of air. However, in the finish of the invention, the ridges and valleys of the grind finish marks are not made uniform in regard to size and pitch, but instead vary from one to another.

The invention will be more fully described in connection with the appended drawings, in which the invention is illustrated in connection with flashless molds for rubber or rubber-like materials and wherein:

FIG. 5 is a cross-sectional view of a flashless injection mold equipped with a grooved sprue plate and having movable cavity inserts;

FIG. 6 is a cross-sectional view of a cavity insert type of flashless injection mold suitable for use with an injection molding machine;

FIG. 7 is a cross-sectional view of a flashless mold having cavity inserts and including a thin bottom plate to which such inserts are fastened as by screws;

FIG. 8 is an elevational view, partly in cross-section, showing apparatus suitable for grinding the microinch finish of the instant invention; and FIG. 9 is an elevational view orthogonal to that of FIG. 8.

Figure 1:
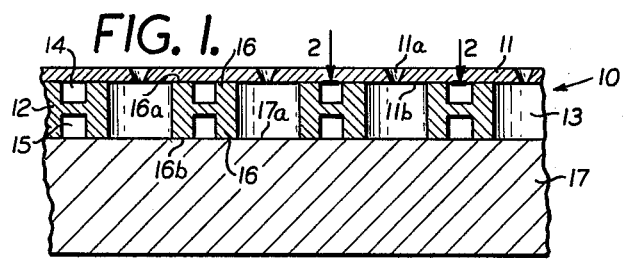
FIG. 1 is a cross-sectional view of a flashless injection mold equipped with a thin flat one-piece sprue plate and a grooved cavity plate, the mold being suitable for use with transfer molding apparatus of the type disclosed in the above-mentioned Patent No. 2,883,704.
Figure 2:
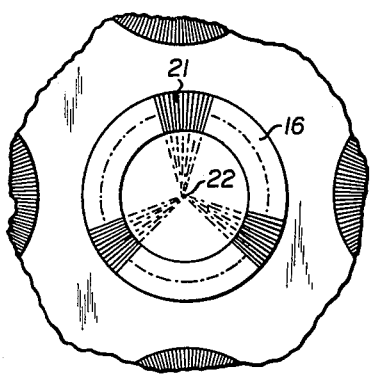
FIG. 2 is a view taken on line 2—2 of FIG. 1 and showing, in exaggerated form, the new polar type of microinch finish herein disclosed.

Referring to the drawings and more particularly to FIGS. 1 and 2, there is disclosed a flashless injection mold 10 equipped with a thin flat one-piece sprue plate 11. Mold 10 is also provided with a cavity plate 12, which together with plates 11 and 17 defines a plurality of cavities 13. Plate 12 is machined out around each of the cavities 13, as at 14 and 15, so as to provide lands 16 surrounding each of the cavities 13. Cavity plate 12 rests on a mold bottom plate 17. Sprue plate 11 is provided with a plurality of sprues 11a for feeding moldable material to cavities 13.

In operation, a "biscuit" of moldable material is placed on top of sprue plate 11 and forced by the action of the molding press through sprues 11a into cavities 13. Since cavity plate 12 is machined out or grooved, as at 14 and 15, it can flex slightly, so that lands 16 come into tight sealing engagement with both the under surface 11b of sprue plate 11 and the upper surface 17a of bottom plate 17. Thus, any normal deflections and/or unevennesses in the mating land surfaces of plates 11, 12 and 17 will be taken up and a positive sealing of the mold cavity lands afforded by the local yielding under the applied pressure of the thin, flexible sprue plate 11 and the flexible cavity plate 12 so as to prevent the formation of flash therebetween.

FIG. 2 illustrates the polar microinch grind finish of the instant invention. With respect to the mold disclosed in FIG. 1, both the top and bottom surfaces 16a and 16b, respectively, of lands 16 are provided with a microinch finish so that the finish marks 21 all emanate from the center 22 of each mold cavity 13, as indicated by the dotted lines. The corresponding mating land surfaces on the lower side of sprue plate 11 and on the upper side of mold bottom plate 17 in FIG. 1 may be either provided with a polar type finish (preferably of a different degree of surface smoothness) or else finished smooth (i.e., less than about 5 microinches). The finish on lands 16 is held, for example, to between 10 and 20 microinches. Finish marks 21 are all straight lines. However, the ridges and valleys are purposely not made uniform in regard to size and pitch, as has been previously explained, but instead vary from one to another. As the moldable material is forced into cavities 13, the air is permitted to escape, thus to avoid the formation of blisters in the finally molded parts.

Figure 2A:
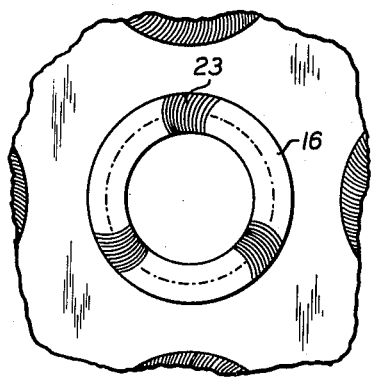
FIG. 2A is a similar view, except that the microinch finish shown is of the circular grind type hereinbefore mentioned.

By way of comparison, FIG. 2a is a view similar to FIG. 2, except that the microinch finish shown is of the radial or circular grind type hereinbefore described. It will be noted that the grind finish marks 23 are such as would be produced by the side or face of the grinding wheel in a manner well known to the art.

Figure 3:
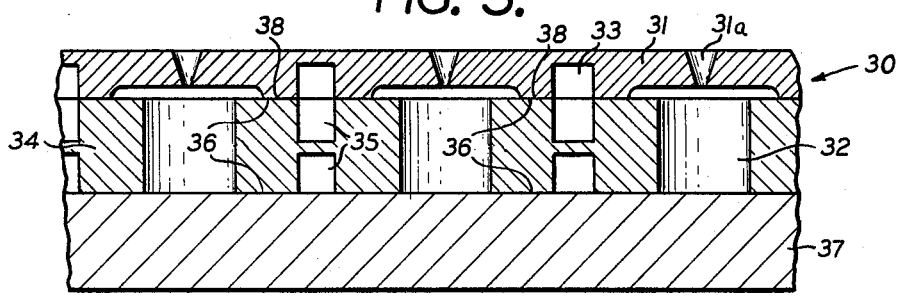
FIG. 3 is a cross-sectional view of a flashless injection mold equipped with a grooved one-piece sprue plate and a grooved cavity plate.

FIG. 3 illustrates another flashless injection mold 30 suitable for use with the instant invention. Mold 30 is provided with a sprue plate 31 having a plurality of sprues 31a therethrough for feeding moldable material into cavities 32. Sprue plate 31, however, is also provided with machined out portions 33 to impart flexibility to the plate. The mold includes a cavity plate 34 which is also machined out, as at 35, to form lands 36 surrounding each of the mold cavities 32. Plates 31 and 34 rest on a bottom plate 37.

Inasmuch as sprue plate 31 in mold 30 has been recessed to contain the enlarged portion of cavity 32, the actual lands or surfaces of contact on the upper side of plate 34 are of reduced area, as indicated by 38. The polar microinch finish is applied to the top and bottom surfaces of cavity plate 34 and may also be applied to the lower side of sprue plate 31 and to the top surface of mold bottom plate 37. Where only one of each pair of mating or contacting land surfaces are provided with a polar finish, such as the upper and lower land surfaces of plate 34, it may be elected, as previously stated, to make the corresponding land surfaces of plates 31 and 37 smooth (i.e., less than about 5 microinches).

Figure 4:
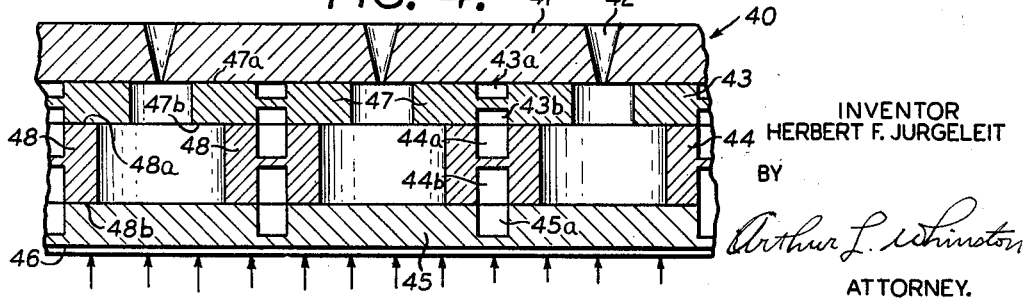
FIG. 4 is a cross-sectional view of a flashless mold having grooved cavity and bottom plates and adapted to rest on a flexible plate which it itself supported by a deformable medium.

FIG. 4 illustrates a multi-plate flashless mold 40. The mold has a top plate 41 with sprues 42 therein, and upper and lower intermediate plates 43 and 44 having grooves 43a, 43b and 44a, 44b therein, respectively. Intermediate plates 43 and 44 rest on a bottom mold plate 45, which forms the lower surfaces of the mold cavities and has grooves 45a machined therein, as shown. Mold 40 is adapted to rest on a thin diaphragm 46, which may be supported by fluid pressure, as shown, or by other deformable material.

In the application of the instant invention to the mold illustrated in FIG. 4, the top and bottom surfaces 47a and 47b of lands 47 and the top and bottom surfaces 48a and 48b of lands 48 are provided with the polar microinch finish. The finish applied to surface 47b, however, would be of a different surface smoothness than that applied to surface 48a. The land surfaces of the lower side of sprue plate 41 and of the upper side of bottom plate 45 may also be provided with a polar type finish or these surfaces may be finished smooth (i.e., less than about 5 microinches).

FIG. 5 illustrates a flashless injection mold 50 equipped with a flexible sprue 51 having a plurality of sprues 51a therethrough. Sprue plate 51, forming the upper surfaces of the mold cavities 57, is grooved out as at 52 in order to have the desired flexiblity. Mold 50 is provided with a bottom plate 53 to which a plurality of inserts 54 are attached as by bolts 55. The upper surface of inserts 54 defines the bottom region of the mold cavities 57. The remaining contour of mold cavities 57 is formed by intermediate inserts 56, which are held in place by an insert retainer plate 58 and are prevented from dropping out of retainer plate 58 during opening of the mold by conventional type retainer rings 59.

A study of FIG. 5 will show that the surfaces that would normally be furnished with the polar finish of the instant invention are the upper and lower surfaces 56a and 56b of intermediate inserts 56, which effectively form lands surrounding the mold cavities. The surfaces will be ground as illustrated schematically in FIG. 2. The corresponding mating surfaces on the lower side of sprue plate 51 and on the upper surface of cavity inserts 54 may be either provided with a polar type finish (preferably of a different degree of surface smoothness) or else finished smooth (i.e., less than about 5 microinches).

FIG. 6 illustrates another flashless injection mold 60 adapted for use with an injection type of molding machine. Mold 60 has an upper plate 61, which is provided with a number of runners 62. Runners 62 feed moldable material to the sprues 63. Mold 60 is further provided with a plurality of cavity inserts 64 and 65 which define the shape of the cavities 66. Inserts 64 by their design are provided with a plurality of lands 67 surrounding each such mold cavity 66. The surfaces of lands 67 on inserts 64 would normally be ground with the polar microinch finish of the instant invention. The corresponding land surface 67a on insert 65 may either be provided with the polar type (preferably of a different degree of surface smoothness) or else finished smooth (i.e., less than about 5 microinches).

Another type of mold suitable for use with the instant invention is that illustrated in FIG. 7. The mold 70 shown therein includes a thin bottom plate 71. Plate 71 does not have sufficient thickness to resist the pressure applied by diaphragm 72. With this mold a number of inserts 73 are used and these inserts 73 are fastened to plate 71 as by screws 74'. The upper surface of inserts 73 defines the bottom region of the mold cavities 74. The remaining contour of the mold cavities 74 is partially formed by intermediate inserts 75, which are held in place by an insert retainer plate 76 and are prevented from dropping out of retainer plate 76 during opening of the mold by conventional type retainer rings 77. Inserts 78 form the upper surfaces of mold cavities 74 and contain the sprues 79. Inserts 78 are held in place by a mold top plate 79a, as shown.

Again in the practice of the instant invention, it will be the top and bottom surfaces 75a and 75b, respectively, of intermediate inserts 75 which are provided with the improved polar microinch finish. It is the intermediate inserts 75 which effectively form the lands surrounding the mold cavities 74. The corresponding land surfaces of inserts 78 and the upper surfaces of cavity insert 73 may be either provided with the polar type finish (preferably of a different degree of surface smoothness) or else finished smooth (i.e., less than 5 microinches).

FIG. 8 illustrates schematically an apparatus suitable for applying the polar microinch grind finish of the instant invention to the surfaces above described. The mold part 81 to be so ground is held in a suitable chuck 82, which is supported by a rotatable fixture 83. A grinding wheel 84 is used and the work is rotated mechanically or manually. Wheel 84 is moved from the solid line position in FIG. 8 to the dotted line position, as shown, or alternatively the work may be so moved and the wheel held stationary. The grinding wheel must always pass through the centerline of the work, as shown in FIG. 9, so that the grind marks will intersect at the center of the mold cavity (i.e., work).

FIG. 9 also illustrates a suitable cross-sectional shape for grinding wheel 84. The width of face 85 of wheel 84, the type of grit and the rotational speed are selected according to the microinch finish desired. For example, where a hardened steel of about 60 to 65 Rockwell "C" hardness is used for the cavity plate or the cavity inserts, a 7 inch diameter grinding wheel having a grit or grain size No. 80 rotating at 3600 revolutions per minute and having a face width of one-quarter of an inch (¼") dressed down to a wheel face width of one thirty-second of an inch (1/32") should be used. The work or table should travel at a speed of 72 inches to 160 inches per minute to obtain a microinch finish of from 10 to 20. This finish could also be obtained if the work or table is stationary and the rotating grinding wheel spindle travels.

Although the invention has been described with reference to flashless injection molds for molding articles of rubber or rubber-like materials, it should be understood that it may also be applied to various other molding and forming processes involving other types of materials. Furthermore, it should be understood that the microinch finish of the instant invention may be produced by methods other than grinding, as, for example, by etching, electroplating, machining, hand operations, or abrasives. It should be further understood that while a surface finish of 10 to 20 microinches has been indicated as satisfactory, the type of steel, hardness or land pressure may require variations in the degree of smoothness. Finally, it should be understood that this invention is not limited to a polar finish of such degree of fineness as to be termed a "microinch" finish; i.e., in various applications it may be advantageous to provide the polar oriented finish or venting means in various other finishes (i.e., not falling within the category referred to in industry as a "microinch finish").

Having thus described my invention, what I claim and desire to protect by Letters Patent is:

1. In a mold the cavity defining portion of which comprises at least two parts, at least one of said parts having lands surrounding the mold cavity, said lands forming a surface engaging a corresponding surface of the other of said parts at points surrounding said mold cavity to form a seal and prevent any flash of moldable material from being extruded between said parts, the improvement comprising:
a microinch finish on at least one of said engaging surfaces, the finish marks of which are all straight lines emanating from the center of said mold cavity.

2. A mold as described in claim 1, in which said finish is between 10 and 20 microinches.

References Cited in the file of this patent
UNITED STATES PATENTS 2,962,761   Hobson    Dec. 6, 1960
2,976,571   Moslo    Mar. 28, 1961